United States Patent

[11] 3,607,550

| [72] | Inventors | Thomas Cass Ballanger<br>Hickory;<br>Jake Schoonderwoerd, Hickory; John H. Oldham, Charlotte, all of N.C. |
|---|---|---|
| [21] | Appl. No. | 778,217 |
| [22] | Filed | Nov. 22, 1968 |
| [45] | Patented | Sept. 21, 1971 |
| [73] | Assignee | E. I. du Pont de Nemours & Company<br>Wilmington, Del. |

[54] APPARATUS FOR MAKING PLASTIC BAGS
8 Claims, 4 Drawing Figs.

[52] U.S. Cl. ............................................. 156/358
[51] Int. Cl. ......................................... B32b 31/04
[50] Field of Search .................................. 156/580–583, 367, 499, 515, 377, 358, 359, 350, 351, 360, 366, 378, 510, 368, 311, 312; 242/57, 57.1

[56] References Cited
UNITED STATES PATENTS

| 3,043,532 | 7/1962 | Seiden | 242/57.1 |
| 3,043,729 | 7/1962 | Seiden | 156/367 |
| 3,360,416 | 12/1967 | Cochrane | 156/583 |
| 3,454,447 | 7/1969 | Corbett et al. | 156/583 |

*Primary Examiner*—Benjamin A. Borchelt
*Assistant Examiner*—Daniel A. Bent
*Attorney*—Hoge T. Sutherland

ABSTRACT: Disclosed herein is an apparatus for effecting longitudinally spaced apart transverse seals with a high degree of linear accuracy in a continuous web of plastic material having a plurality of layers. The apparatus comprises two sets of dual sealer drive rollers for advancing the web past the sealer, and a means for accurately controlling the operation of the sealer and drive rolls. This control means comprises a digital converter operatively in contact with the drive rollers, adapted to convert the angle through which the roller has rotated into a train of electrical pulses. A counter is operatively connected to the converter and is responsive to the train of pulses so that when a predetermined number of these pulses are recorded, an electrical signal is emitted that activates a brake to stop the drive rolls and concomitantly activates a sealer.

APPARATUS FOR MAKING PLASTIC BAGS

DETAILED DESCRIPTION OF THE INVENTION

This invention relates to improvements in plastic sealing devices for effecting transverse seals. In U.S. Pat. No. 3,360,416, dated Dec. 26, 1967, there is disclosed a heat and pressure sealing device, which provides means for effecting transverse seals in plastic sheet stock. Such apparatus employs a photoelectric means to detect lines or marks on the web being sealed as a manner of controlling the web length as it is fed through the sealer. Broadly, this particular disclosure impliedly recognizes the problem inherent in all plastic bag manufacture using a continuous web, i.e., controlling in a highly accurate form the amount of plastic web being fed through the sealer. The instant invention addresses itself to this broad problem by using an electronically controlled circuit to positively and accurately measure the amount of plastic web that has been fed to the sealer. Prior art control means for controlling web feed generally resulted in about an 8 percent error. This is to say, prior art plastic bag sealing means can effect a seal on a plastic web at a predetermined spot, only within plus or minus 8 percent of the web length fed. The instant invention describes apparatus that allows a web to be fed through a sealer means with an accuracy of plus or minus one-half of 1 percent of web feed. Furthermore, no indicia is required to be first placed on the web before it is sent through the sealer means, nor is there any beam from a photoelectric cell in contact with the plastic web itself. Only when the plastic web is in actual motion will the control means indicate a measured linear length of plastic being sent into the sealing means. In prior art disclosures, using either time delay or other such means, slippage of the plastic web on drive rolls, while being traversed through the sealer, resulted in the 8 percent error commonplace in prior art apparatus. The instant invention solves this problem.

It is among the objects of the present invention to provide an improved bagmaking machine in which juxtaposed layers of heat-sealable material are passed through a machine at uniform high rate of speed and sealed together at spaced intervals to form the individual containers.

Another object of the instant invention is the provision of a novel mechanism for making regularly spaced heat seals in a rapid moving, continuous web of heat-sealable material and yet still maintain a high degree of reproducibility of linear accuracy from bag to bag.

In accordance with a preferred embodiment of the instant invention, the foregoing and other objects and advantages are attained in a machine wherein a continuous web of heat-sealable material is drawn from a supply roller at a high rate of speed and passed over a folding table, which shapes the material to form a double-layered strip. The folded material then passes through a heat-sealing mechanism where accurately measured lengths of the thus folded—or for that matter tubular plastic material—are fed into a sealer means where a sealing operation takes place.

The apparatus disclosed herein has a positive infeed and outfeed roller drive system with a perforating knife and heat-sealing means situated in between the infeed and outfeed roller means, together with a preselective measuring and control means contacting and coacting with either the infeed rollers or the web itself to control the feeding, measuring and cutoff operations accurately.

Prior art apparatus normally use plastic web material less than 3 mils in thickness. The inherent and generally accepted 8 percent wastage or inaccuracy of prior art feeding means is not too economically significant when less than 3 mil thick plastic webbing is employed; however, when plastic webbing of a thickness of 3 mils or greater is employed, then the 8 percent inaccuracy of prior art apparatus becomes economically prohibitive.

With the advent of palletize packaging, plastic bags of a length in excess of 100 inches have become desirable. Bags of cement, sugar, books, bricks, glass bottles, canned foods and frozen cartons have, in the past, been placed on wooden pallets and then secured to the wooden pallets for future shipment by means of steel strapping and cardboard. To any manufacturer of such goods, adapted to be shipped by a palletized packaging, this procedure has become cumbersome and most expensive. With the advent of shrinkable structurally strong (3 mils or greater in thickness) plastic film, palletized packaging has become much simpler and more economical process. A wooden pallet is first loaded with the goods to be shipped and then a preferentially oriented plastic, e.g. polyethylene shrink film with extremely high tensile strength, is placed thereover. The thus enclosed goods, along with the pallet, are then traversed through an oven or heating means and the elastic memory of the plastic is made use of to shrink the plastic onto the goods along with the pallet. The advantages of palletized packaging with shrink film are quite obvious, e.g. no steel bands or cardboard are required and the entire pallet becomes for all intent and purposes waterproof. Furthermore, such a palletized shrink film composite can be tipped to any angle from the horizontal without the enclosed goods falling off the pallet, because of the film strength and mechanical bond created during shrinking of the film to the goods and pallet. Thus, there is and has been a long felt need for an apparatus that could rapidly and accurately feed long lengths (100 inches or more) of plastic webbing into a sealer means. This need is presently epitomized by the fact that such large heat shrinkable palletized packaging bags are now being made entirely by hand. Obviously, this is a most time consuming and expensive means of making bags; thus, it would be most desirable if such bags could be made on automatic high-speed apparatus and dispense with the low productive requirement of human labor. This goal is accomplished by the instant invention. Additionally, the instant invention not only provides an apparatus for accurately feeding a center folded or tubular plastic web into a sealer means, but does it far faster and at an accuracy that is far greater than that accomplished by feeding such a web by hand into a sealer means.

Additional objects, features, novelty and utility will become evident relative to the control system including location and character of clutches, brakes, and resetting means, arranged and functioning in the manner and for the purposes hereinafter described in view of the drawings, in which.

Figure 1:
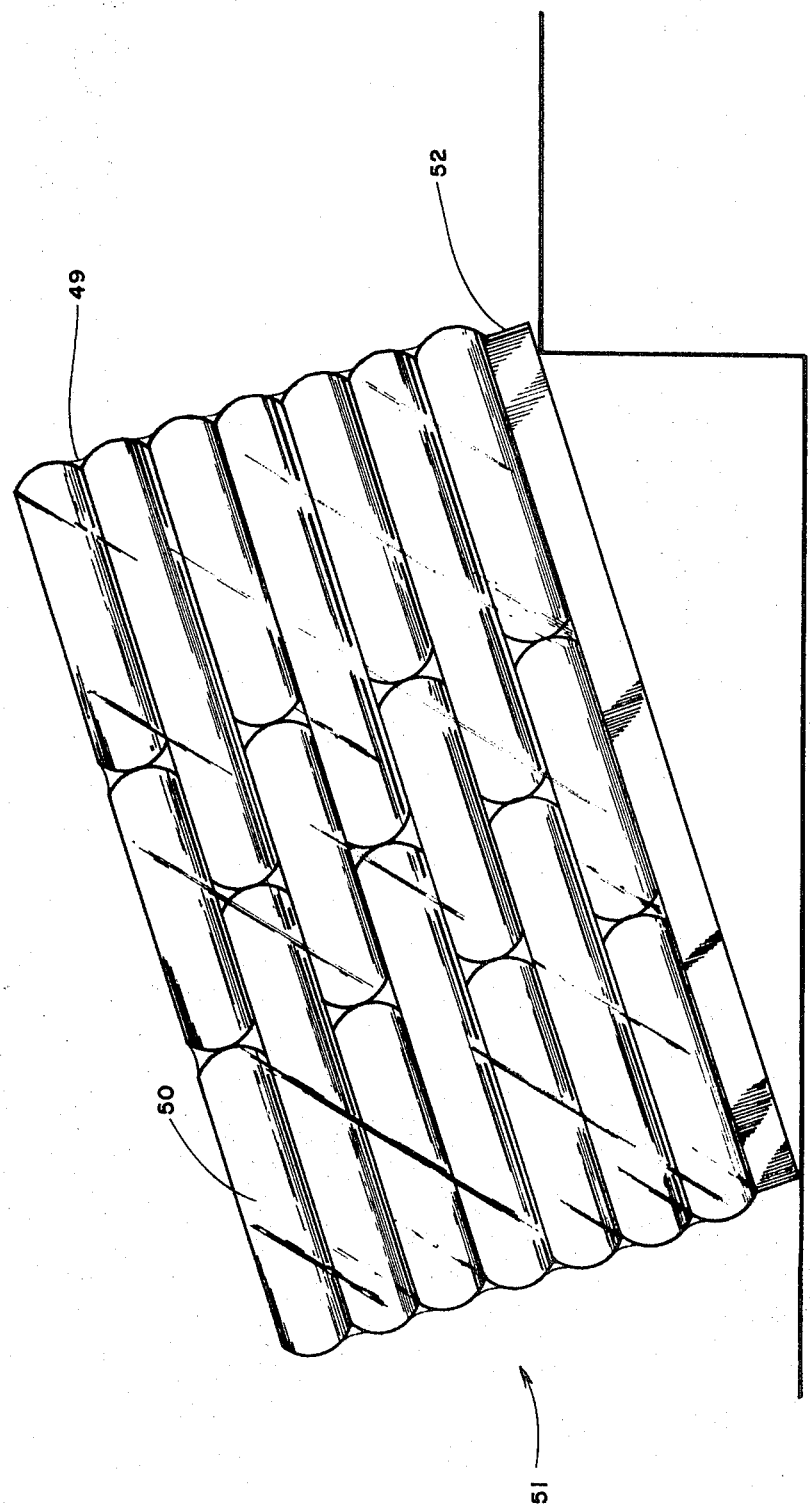
FIG. 1 is a pictorial representation of bags of merchandise disposed on a pallet, which are in turn enclosed by a heat shrunk plastic film made by the apparatus disclosed herein.

Shown by element (51) in FIG. 1, is a pallet (52) on which bags of merchandise (50) are stacked. Both the pallet (52) and bags (50) are completely enclosed by a plastic bag (49) made by apparatus of the instant invention. The composite (51), composed of pallet (52), bags (50) and covering (49), is shown in a position other than horizontal to emphasize the fact that heat-shrinkable plastic coverings (49), in which a commodity such as (50) and pallet (52) are disposed, can be subjected to heat and the mechanical strength plus the elastic memory of the bag (49) is such that the subsequent shrinkage resulting from applied heat is sufficient to maintain the bags (50) on pallet (52) in their original position, not withstanding any subsequent tilting. When it is realized that the covering or plastic bags (49) have at least one dimension that is no smaller than 100 inches in magnitude and that bags (50) represent bags of Portland cement, sugar, flour, and the like, capable of holding up to and exceeding 100 pounds of merchandise, the thickness of plastic bag (49) must be such that it inherently possesses the mechanical strength in its shrunk position to maintain a pallet (52) loaded with commodities (50) in any desired position. Thus, the heretofore simple problem of making a plastic bag on known apparatus is compounded by the fact that a high degree of accuracy is required when making bags of 100 inches in length or longer, because anything other than a high degree of accuracy would make the manufacture of the bags using thicker than normal plastic material economically prohibitive. In view of the fact that prior art plastic bagmaking apparatus could draw out a web of plastic material to a predetermined given length with an accuracy of no more than 8 percent dictates that such prior art apparatus would not be applicable to making plastic bags having at least one dimension of which is normally 100 inches. It is the achieved purpose of the instant invention to solve such a problem.

Figure 2:
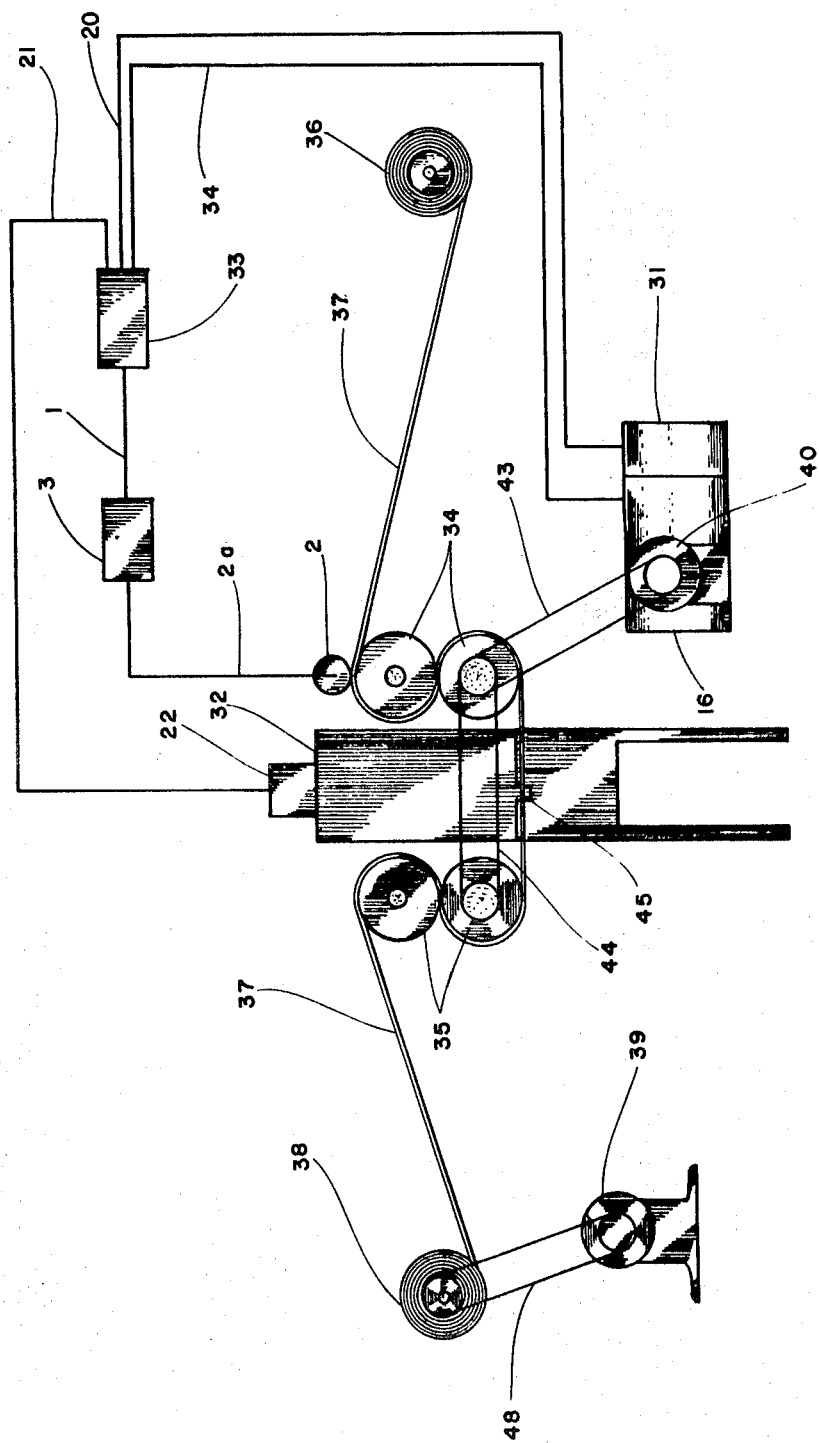
FIG. 2 is a generalized schematic, representation of the control, web feeding, and sealing apparatus.

In FIG. 2 there is shown a generalized schematic or pictorial representation of the apparatus combination that achieves the stated goal of accurately measuring a given length of plastic web within an accuracy of one-half of 1 percent of the measured web. Element (37) represents the plastic web drawn from supply roll (36) and passed over the top of a first pair of draw rolls (34). It will be noted that plastic web (37) follows a sinuous S-shaped and tortious path over the top of the first of draw roll pair (34) around a portion of that draw roll and around an opposite portion of the second of draw roll pair (34) and thence into the sealer means (32). Web (37) follows a similar S-shaped passage through draw rolls (35) and thence to rewind roll (38). Represented by element (39) is a constant torque motor, which is adapted to maintain a constant torque or tension or rewind roll (38). Stated in another manner, this constant torque motor (39) is one that is continually "stalled" in that it is adapted to exert a predetermined tension to be maintained on web (37) through rewind roll (38). Riding on either drive roll (34) or web (37) is a wheel (2) of an accurate predetermined circumference. Through connector means (2a) wheel (2) is in rotating communication with pulse generator (3), which is adapted to convert the angular rotations of wheel (2) into a train of electrical pulses. These electrical pulses travel down lead (1), which is in electrical communication with pulse counter (33). Upon the pulse counter (33) recording a predetermined number of electrical pulses, an electrical signal is sent out from pulse counter (33) on leads (20), (21), and (34). The operation and manner of performance of the pulse counter (33) will hereinafter be described later in more detail.

Wheel (2) as it rotates has its angular rotations converted by pulse generator (3) into a train of electrical pulses and upon the pulse counter (33) recording a predetermined number of pulses—which is a function of the number of times wheel (2) has rotated and therefore a function of the amount of web that has been fed into the sealer means, i.e., that web situated in a horizontal position between rolls (35) and 34— the feeding of web (37) into sealer (32) is stopped by simultaneous coaction of clutch (31) and brake (16). Motor (40) is driveably connected to the bottommost roll of drive rolls (34) and (35) by drive means (chain or belt) (43) and (44). It is to be understood that motor (40) is continuously powered, but not necessarily continuously engaged by means of its drive shaft (not shown) so as to drive the drive means (43) and (44) and associated drive rolls (34) and (35).

Once pulse counter (33) has recorded that predetermined number of pulses set by an operator, which would represent in linear length that length of plastic web sought to be accurately positioned for sealing purposes transversed to sealer (32), an electrical signal is sent out on leads (20), (21), and (34). This electrical signal simultaneously accomplishes three (3) separate and independent functions: it releases clutch (31); engages the brake (16); and, energizes sealer motor (22). Drive roll motor (40), as previously stated, is continuously powered and thus only when the clutch (31) is engaged is the drive shaft (not shown) engaged with motor (40). Consequently, when the clutch is released the inertia of the rotating drive shaft would cause still further rotation of the drive shaft and subsequent movement of drive rolls (34) and (35). Therefore, when clutch (31) is disengaged, brake (16) is simultaneously engaged and this brake seizes the otherwise rotating drive shaft and brings it to an immediate halt. Simultaneously with this disengagement of clutch (31) and engagement of brake (16), there is an activation of sealer motor (22), which causes the sealer head to reciprocate in a vertical plane and cause a weld or seam in plastic web (37) in a conventional manner.

Figure 3:
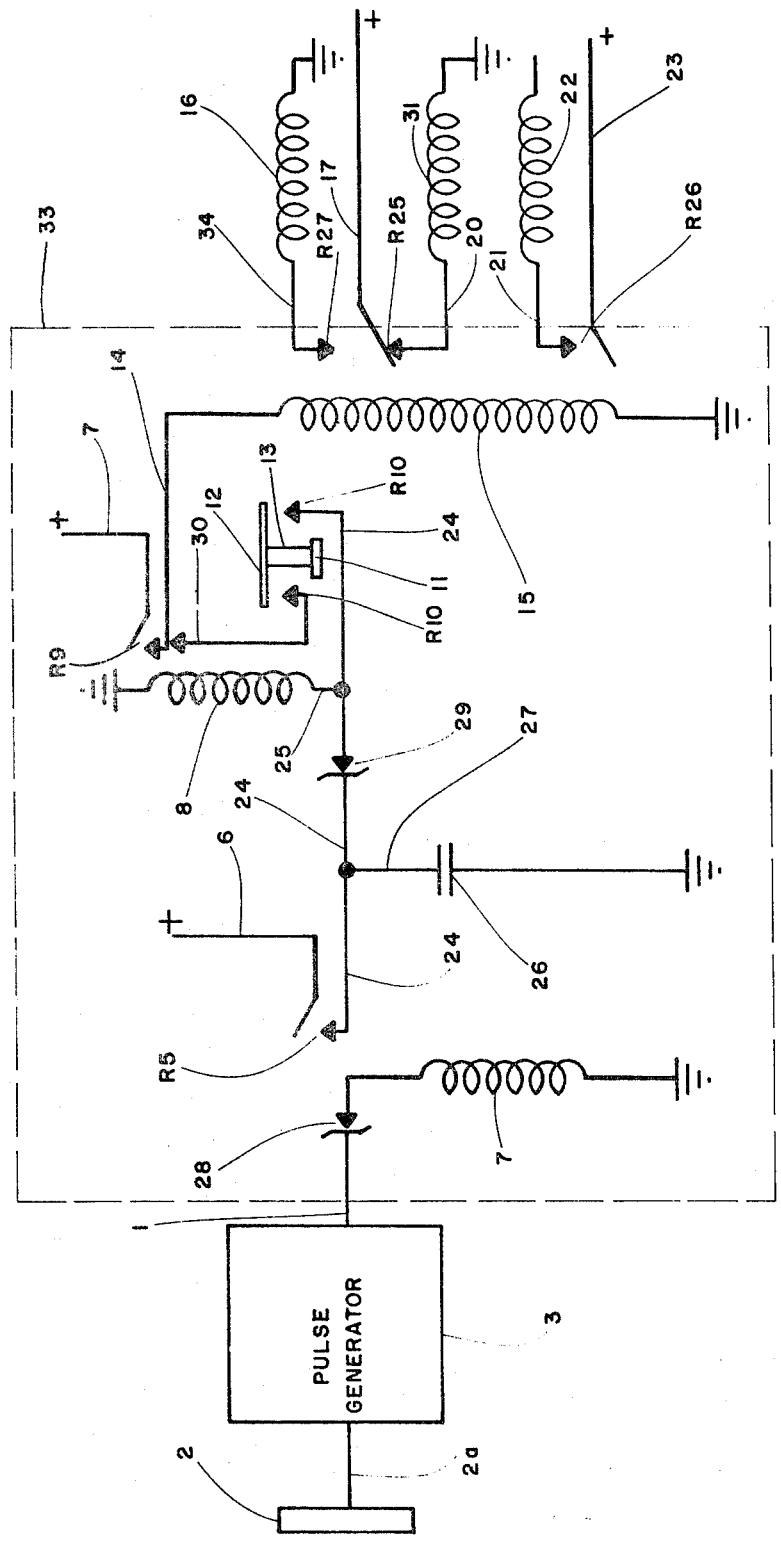
FIG. 3 is a detailed schematic diagram of the control circuit.
Figure 4:
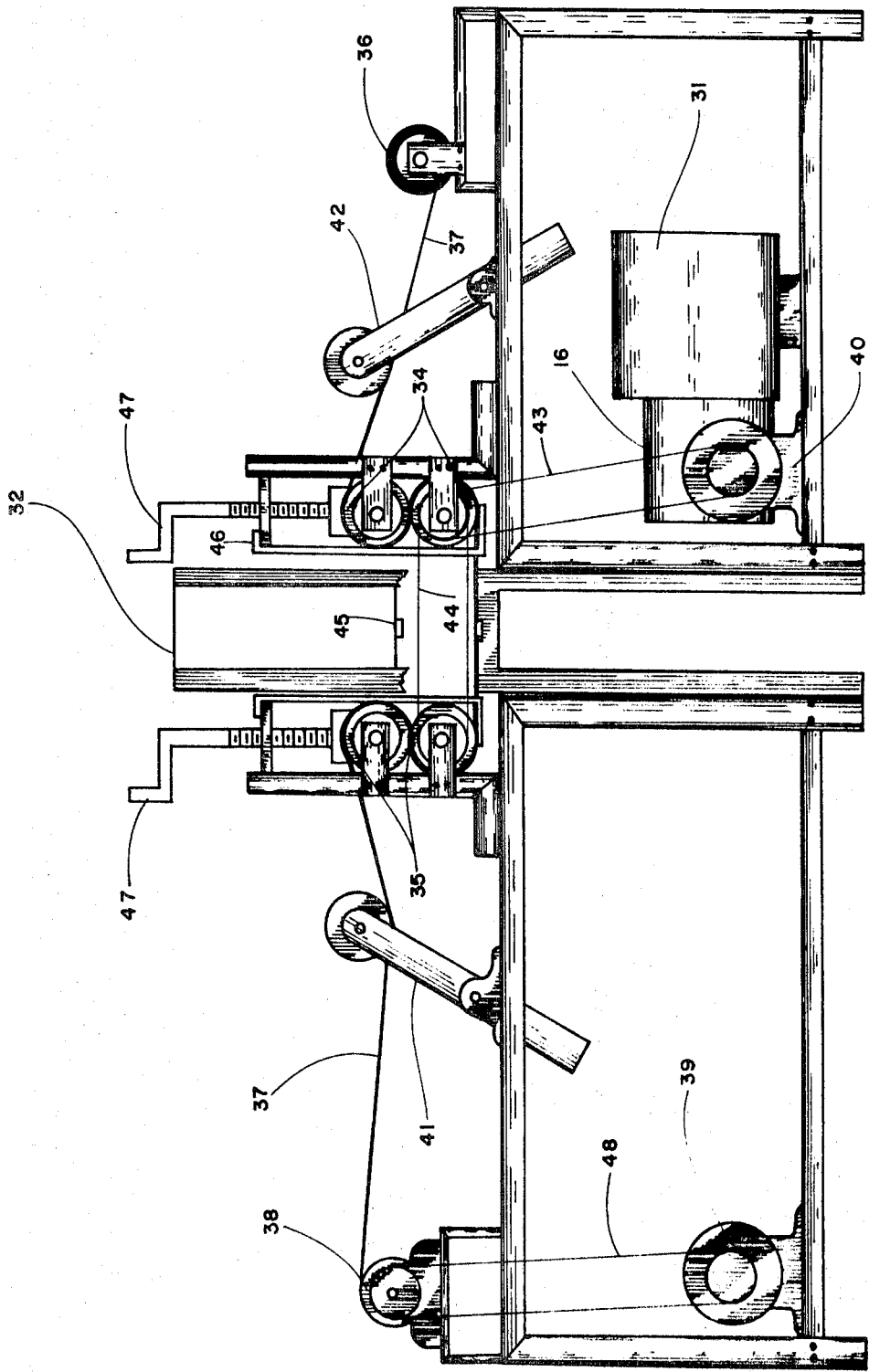
FIG. 4 is a generalized view in pictorial form showing the plastic web feeding and control apparatus in combination with a sealer means.

There are three separate and independent, as well as distinct, motors associated with the apparatus as shown in FIGS. 2 and 4. Torque motor (39) is separately powered and its function is to maintain a predetermined tension on web (37). Motor (40), although continuously and separately powered similar to torque motor (39), is used to intermittently drive draw rolls (34) and (35) in a predetermined fashion so as to traverse accurately web (37) in a horizontal position transversed to sealer means (32). A third motor, also separately powered, is shown by element (22) and this motor is intermediately activated and deactivated, as will be subsequently explained, by pulse counter (33) and the movement of sealer means (32) respectively. Sealer means (32) comes into physical and mechanical engagement with button (11), (FIG. 3) and such physical contact causes button (11) to be pushed inward and thus disengaging crossbar member (12) (FIG. 3) from contacts R-10, also of FIG. 3. Two other switches (not shown) are located on frame (43), see FIG. 4, and are also activated simultaneously by the reciprocation of seal head (32) in the vertical plane. The first of these switches, which incidentally form no part of the instant invention, is used to energize heater means 45 and the second of these switches is a time-delay switch, which upon activation causes the reciprocating head (32) to remain in a sealing position for a predetermined length of time. Upon sealer head (32) reciprocating in an upward direction, both the time-delay switch (not shown) and the heater switch (not shown) are deactivated by this movement.

With the generalized description of the sealer-control combination shown in FIG. 2 as background, attention now is directed to FIG. 4 wherein a more commercialized pictorial representation of the apparatus is shown. Consistent with the disclosure and description of FIG. 2, there is shown in FIG. 4, feed roller (36) around which plastic web material is wound for feeding into sealer (32). Web (37) is maintained in alignment and proper tension by dancer roller (42) and (41), in combination with torque motor (39). As indicated in FIG. 2, element (38) is a rewind roller operably connected by means of belt or chain (48) to torque motor (39). This motor, which is in a constantly stalled condition, is used to maintain a proper tension on web (37) through rewind roller (38).

Clutch (31) and brake (16) are shown to be operably connected to drive roller motor (40), which in turn is operably connected to drive rollers (34) and (35) by belt or chain means (43) and (44) respectively. It is to be understood that the brake (16) and clutch (31) are operably and electrically connected to digital control apparatus, elements (2), (3), and (33), shown in FIG. 2, which in turn are electrically connected to motor (22) used to move the sealer head (32) in a reciprocal manner in vertical plane. The control means [(2), (3), and (33)] has not been shown in FIG. 4, but its manner of operation and connection to clutch, brake, sealer motor and web (37) is the same as shown in FIG. 2.

Wheel (2), shown in FIG. 2, can either ride on the web (37) or its outer peripheral surface can be in contact with roll (34), whichever the case may be. Additionally, wheel (2) may also be in contact with roll (35) or ride on web (37) as it passes over drive roll (35). As a further embodiment, wheel (2) may be rotationally connected to either drive roll (34) or (35) by means of a drive shaft. The pervasive principal that must be observed as far as relating the rotation of wheel (2) to the traverse of web (37) from right to left in FIG. 2 is that the rotation of wheel (2) is to be a positive function of the linear traverse of web (37). Thus, whether wheel (2) is allowed to rotate on top of the traversing web (37), rotating rolls (34) or (35), or is fixedly attached by means of a drive shaft to rolls (34) or (35) is a matter of mechanical design.

Notice should be made of the previously mentioned S-shaped path web (37) follows as it is traversed through sealer means (32). It is this particular path in combination with draw rolls (34) and (35) having a plastic covering (rubber, silicone rubber, or polyurathane for example) that reduces slippage of plastic web (37) when being conveyed by draw rolls (34) and (35). Such a draw roll design coupled with the S-shaped path makes for a positive displacement of web (37) traverse upon any rotation of draw rolls (34) and (35). Consequently, the forementioned combination in further combination with wheel (2) makes for a most accurate means for measurement of web (37) traverse. The tortious S-shaped path combined with plastic coated nonskid rolls insures that the rotation of the draw rolls will also be a traverse of web (37).

Shown in FIG. 3 is a simplified schematic diagram, exemplary of the apparatus and manner in which the instant invention control mechanism operates. In order that one may understand how this control mechanism functions, a circuit description and mode of operation of circuit follows:

Element (2) can be a plastic (Teflon) coated wheel having an accurate circumference that rides on and rotates as the plastic web is advanced through the drive rollers and into the sealer. Mechanical rotations of wheel (2) are transferred by shaft (2a) to pulse generator (3) where these rotations are converted by pulse generator (3) into a series or train of electrical pulses that subsequently travel down lead (1) to counter (33), set off by dotted lines. This train of signals then pass through blocking diode (28) and into coil (7), which is a part of relay (R-5). When coil (7) is energized, the contact of relay (R-5) is caused to be in electrical connection with lead (6), which in turn is attached to a power source (not shown, but indicated by the pulse symbol). Electrical pulses emanating from pulse generator (3) only momentarily close the relay (R-5); therefore, pulsating peaks of electrical energy from lead (6), travel along lead (24), into lead (27), and then into capacitor (26). Capacity (26) is a capacitor of a predetermined value, adapted to capture and store pulsating peaks of electrical energy. Upon achieving its capacity, capacitor (26) discharges, sending the thus stored electrical energy up through lead (27) down lead (24), through blocking diode (29), up through lead (25) to momentarily energize coil (8). Coil (8) is part of relay (R-9), and upon being energized, relay (R-9) is closed and comes into electrical contact with lead (7), which in turn is in further electrical connection with a power source (not shown), but indicated by the plus sign on this particular lead). Relays (R-10) are also affected by the coil (8) becoming energized and are physically moved to come into electrical communication with cross conductor (12). Conductor (12) is a transverse member of a switch or button (11) having an arm (13). From the closing of contacts (R-9) and (R-10), two functions are accomplished:

a. The first function is to send electrical energy down through lead (7) from a power source, through contact (R-9), down through lead (30) through the left-hand portion of relay (R-10), across the transverse electrical conductor (12) down the right-hand member of relay (10), and then through lead (24) back into lead (25) and coil (8), thereby energizing coil (8). Thus, relay (R-9) is maintained in a closed position as long as this current can flow through this described path; and, b. The second function is to send electrical energy flowing down through lead (7) from the previously mentioned power source, through contact (R-9), through lead (14) and into coil (15), so as to energize this coil.

There are three functions that the current (a predetermined electrical signal), traveling down lead (14) accomplishes. This current deactivates a clutch (31), thus disengaging the drive shaft of motor (40) that drives the drive rolls (34) and (35); activates braking means (16) so as to cease rotation of the drive shaft, and activates motor (22) that drives the sealer (32). Relay (R-25) in its normal position is closed, i.e., power is flowing from a source [not shown but indicated by the plus (+) sign] through (17) and relay (R-25) through lead (20) to coil (31), which represents the clutch. When coil (15) is energized, relay (R-25) becomes open, i.e., disengaged from lead (20), thus activating relay (R-27), i.e., lead (17) is in electrical connection with a contact (R-27). The closing of relay (R-27) sends power from a source (not shown) through relay (R-27) and into coil (16), which represents the brake (16). Also upon coil (15) becoming energized, relay (R-26), which has a normal position of being opened, is closed and power [indicated by plus (+) sign, but not shown] flows down through lead (23), through relay (R-26), up lead (21) and into coil (22), which represents the motor (22) that drives the sealer (32). In retrospect, it can be thus seen that when coil (15) is deenergized, the brake and sealer motor relay contacts will go back to their normal open position and the clutch relay will engage, (as shown in FIG. 3), thus causing the drive roll motor (40) to engage its drive shaft (not shown). The drive motor (40) is continuously powered at all times, but engaged to its drive shaft only when the clutch (31) is in operative position.

Button (11) is a manual reset that is physically activated by the head of the sealer (32) when it moves in an upward motion. The transverse connector (12) of button (11) is normally not in contact with the relays (R-10) on both sides thereof. However, as indicated previously, when coil (8) is energized, transverse member (12) is in electrical connection with both contact points of relay (R-10). When the sealer head reaches its cycle termination, button (11) is pushed by the sealer head. Then, through arm (13), connector member (12) is disengaged from the two contact points of relay (R-10). Once this is accomplished, there is no path for the electrical energy flowing down through lead (7) through (R-9) to return to coil (8). Thus, relay (R-9) becomes open, therefore not allowing current from lead (7) to flow into lead (14). Consequently, coil (15) is deenergized, thus causing relays (R-25), (R-26), and (R-27) to return to their normal positions as shown in FIG. 2. This normal position represents an engaged clutch (31), a disengaged brake (16), and a deenergized sealer motor (22).

It is to be kept in mind that the foregoing is an exemplary version of a digital counter control system, stripped of all confusing, but commercially desirable sophisticated circuitry. Obviously the capacitor (26), which represents a counting mechanism, can be more elaborate in that a plurality of capacitors set for a plurality of values can be provided. As an alternative, logic circuits can be used to replace the capacity (26). Also, relays can be replaced by transistors to accomplish the same purpose. It is to be noted that blocking diode (29) is placed in its particular position, along the lead (24), to block current coming down lead (7) from flowing into capacitor (26). Blocking diode (28) is used for a similar purpose.

Pulse generator (3) is basically composed of a photoelectric cell that has its light beam playing on a rotating disc, having a plurality of circumferentially spaced-apart holes. Light pulses transmitted by the holes, as the disc rotates, are converted into electrical energy and suitably amplified to form the train of electrical pulses fed to lead (1). Typical pulse generators are commercially available, for example Model MW-1 Pulse Generator, made by Wer Industrial Corporation of Buffalo, N.Y. Furthermore, commercially available digital counters, such as Wer's Model DDP-4 Four Decade with logic circuits, can be used for counter (33). Magnetic clutch (31) and brake (16) are also well-known commercial items. Model CB-20 Clutch-Brake Combination manufactured also by Wer can be used to carry out the functions of clutch (31) and brake (16).

Mention was made earlier in the disclosure about sealer (32) having not only heater (45) but also a perforating knife. Inasmuch as such a knife-heater combination are well-known items, they are not considered to form a part of the instant invention. The perforating knife (not shown) was mentioned for the sake of completeness and is considered to be within the purview of a skilled artisan knowledgeable in the art to which the disclosure pertains.

Briefly turning attention to FIG. 4, element (47) shows a screwlike device used for raising and lowering drive rolls (34) and (35). Frame (46) is used to mount a microswitch (not shown) and time-delay switch (not shown), as well as switch (11) shown in FIG. 3. Inasmuch as the first two mentioned switches form no part of the instant invention and are well known in the plastic bag making art, further discussion is felt to be unnecessary. It is to be understood that web (37) can be made from either polyethylene or polypropylene, or any thermoplastic that can be made to possess an elastic memory, e.g. biaxially or axially oriented.

In summary, the apparatus of the instant disclosure is one that is adapted from affecting longitudinally spaced-apart transversed seals with a high degree of linear accuracy in a continuous web of plastic material having a plurality of layers. Sealer drive rollers of the instant invention, used for advancing the web past the sealer, are used either per se or with a rotating disc, in combination with a pulse generator to convert the rotation of the drive rollers into a train of electrical pulses, which are subsequently fed into an electronic counter. Such an electronic counter not only is operably connected to the converter, but is responsive to the train of pulses so that when a predetermined number of such pulses are recorded an electrical signal is emitted that activates a brake to stop the drive rolls, deenergizes a clutch, which disengages the drive motor from its drive shaft, and simultaneously activates a sealer motor. Such an interaction and coaction of sealer means and web feeding control apparatus feeds a plastic web into the sealer means with a plus or minus one-half of 1 percent (of the thus fed web) accuracy. Inasmuch as the instant invention is designed to be used primarily with plastic webbing that has a thickness of at least 3 mils, the accurate feeding of such a web is immediately economically attractive.

The very fact that prior art bag-sealing means could feed plastic webbing into a sealer means with only an 8 percent accuracy created the need for an apparatus that would perform the function that the instant apparatus achieves. Furthermore, in view of the fact that plastic bags with a web thickness of at least 3 mils or greater and one dimension of at least 100 inches were made by hand up to the time of the reduction to practice of the instant invention, accented a need for just such an apparatus.

From the foregoing, it is believed that the invention may be readily understood by those skilled in the art without further description, it being born in mind that numerous changes may be made in the details disclosed without departing from the spirit of the invention as set forth in the following claims:

We claim:

1. An apparatus for conveying and intermittently sealing portions of an indefinite length of plastic comprising:
   a. a draw roll means spaced apart from a sealer means;
   b. drive means for driving said drive roll in the absence of a predetermined electrical signal;
   c. pulse means contacting said draw roll for converting revolutions of said draw roll into electrical pulses; and
   d. counter means in electrical contact with said pulse means adapted to generate said predetermined electrical signal upon recording a predetermined number of pulses, wherein said pulse means comprises a wheel whose surface is in contact with and rotatable about a draw roll and in further mechanical connection with a means for converting mechanical revolution of said wheel into a predetermined number of electrical pulses.

2. An apparatus for conveying and intermittently sealing portions of an indefinite length of plastic comprising:
   a. a draw roll means spaced apart from a sealer means;
   b. drive means for driving said drive roll in the absence of a predetermined electrical signal;
   c. pulse means contacting said draw roll for converting revolutions of said draw roll into electrical pulses; and
   d. counter means in electrical contact with said pulse means adapted to generate said predetermined electrical signal upon recording a predetermined number of pulses, wherein said counter contains means for erasing pulses previously recorded by said counter.

3. An apparatus as defined in claim 2, wherein said sealer is adapted to activate said means for erasing pulses previously recorded by the counter upon reaching a nonsealing position.

4. An apparatus for conveying and intermittently sealing portions of an indefinite length of plastic comprising:
   a. draw rolls disposed on both sides of and spaced apart from a reciprocating means for sealing plastic material;
   b. drive means for driving said drive rolls in the absence of a predetermined signal;
   c. pulse means contacting said draw rolls, for converting revolutions of said draw roll into electrical pulses; and,
   d. counter means in electrical contact with said pulse means for counting pulses generated by said pulse means and adapted to generate a predetermined electrical signal upon recording a predetermined number of said pulses, said electrical signal being adapted to activate means to (1) disengage said drive means from a drive disengageably (2) brake said drive shaft to a halt; and (3) operate said sealer means.

5. An apparatus as defined in claim 4, wherein said counter contains means for erasing pulses previously recorded by said counter.

6. An apparatus as defined in claim 5, wherein said sealer is adapted to activate said means for erasing pulses previously recorded by the counter upon reaching a nonsealing position.

7. An apparatus as defined in claim 4, wherein a pair of coacting draw rolls are disposed on both sides of said sealer means adapted to traverse a web of plastic material in an S-shaped path through each path in order that there be sufficient frictional forces between said web and said pair of draw rolls to prohibit slippage between the web and draw rolls.

8. An apparatus for effecting longitudinally spaced-apart transverse seals in a continuous web of plastic material having a plurality of layers, comprising means for producing said seals, drive roller means for advancing said web past said seal-producing means and control means for controlling operation of said seal-producing means, said control means comprising a digital converter operatively connected to said drive roller means for producing a train of electrical pulses, which represent in number the angle through which said roller means is rotated and means operatively connected to said converter and being responsive to the production of a predetermined number of pulses for rendering said drive roller means inoperative to advance said web, and for activating said seal-producing means for transversely welding the layers in said web together.